J. HAYNES.
Corn-Planter.

No. 23,371.  Patented Mar. 29, 1859.

Witnesses:
A. Brown
Sam. Adams

Inventor:
Jacob Haynes.

UNITED STATES PATENT OFFICE.

JACOB HAYNES, OF CAMERON, ILLINOIS.

IMPROVEMENT IN CORN-PLANTERS.

Specification forming part of Letters Patent No. 23,371, dated March 29, 1859.

*To all whom it may concern:*

Be it known that I, JACOB HAYNES, of Cameron, in the county of Warren and State of Illinois, have invented certain new and useful Improvements in Corn-Planters; and I do hereby declare that the following is a full, clear, and exact description of the construction and operation of the same, reference being had to the accompanying drawings, in which—

Figure 1:
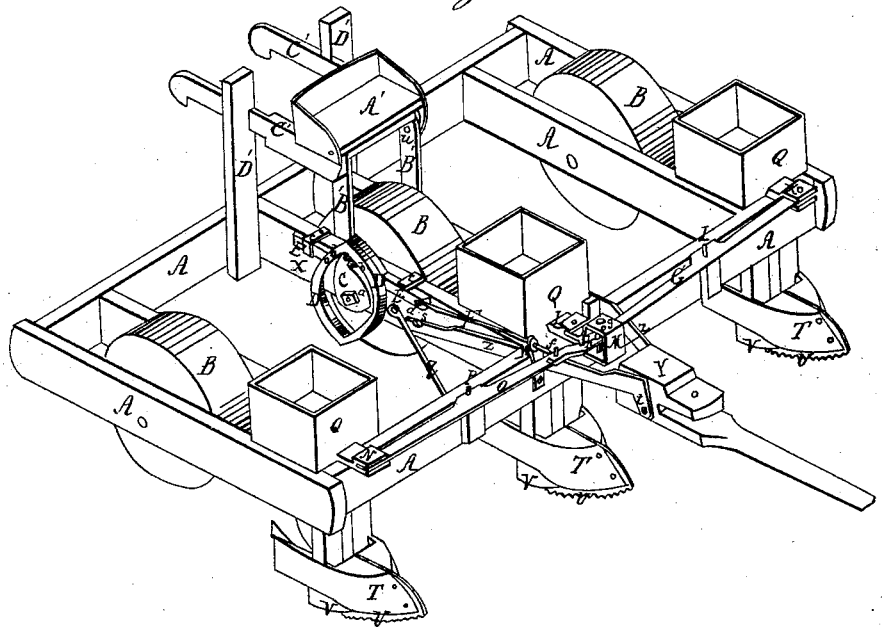
Figure 2:
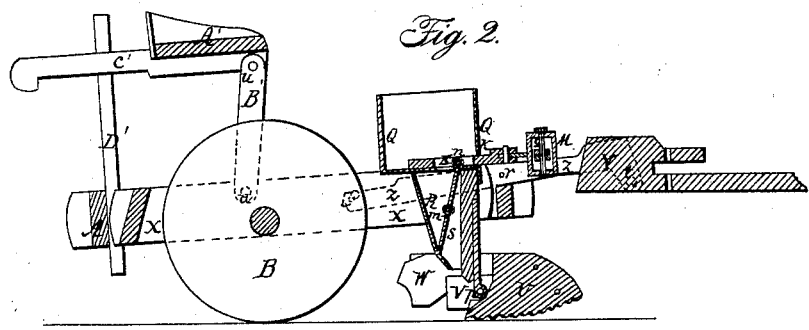
Figure 3:
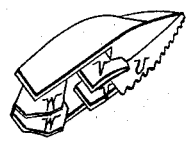

Figure 1 represents a perspective view of said corn-planter. Fig. 2 represents a longitudinal vertical section through the same. Fig. 3 represents a perspective view of the shoe by which the seed-furrows are made and covered, as will be more fully described.

To enable others skilled in the art to make and use my invention, I will proceed to describe its construction and operation.

A represents the frame of the machine, which is supported by the wheels B.

C represents a cam, which is secured to the shaft of one of the wheels B by means of a screw-nut, $a$. This cam, on turning on its shaft, plays within and operates upon the cam-yoke D, which is secured to the rod E by means of the screws $b$. The rod E is supported in its rectilinear movement by the guides $c$.

F represents a connecting-rod, which is pivoted at one end to the rod E, as represented at $d$, and the other end of which is secured at $f$ to the lever G. The rod F is supported in its longitudinal movements by a guide, H, through which it passes. The lever G has its fulcrum at I, and is pivoted at its end to the seed-slide K. The seed-slide L is also operated by this lever, and is pivoted to it by means of a bolt, $g$, which is secured to the yoke M of the seed-slide L, and which is hinged at one end to the third seed-slide, N, while its other end is held by the bolt $g$, which passes through a slot in said lever.

Q represents three seed-boxes, which contain the corn to be planted, and in each of which the slides K L N are respectively vibrated. Each of these is formed with a seed-cell, $k$, which contains the seed to be planted in one hill.

R represents the seed-tube, which is secured beneath each of the seed-boxes.

S is a turning valve, which has its fulcrum at $m$, and which is pivoted at $n$ to the seed-slide K.

T represents a metal shoe. It is composed of two parts, which are secured together by screw-bolts or otherwise, and which hold between them a serrated metal plate, U. The object of this serrated plate is to cut up any stalks or roots which might be in the ground. The shoe is also formed at its lower side with two wings, V, which are intended to open the furrow for the reception of the seed, while in the rear of them are secured to the shoe two other wings, W, which cover up the furrow after the seed has been dropped therein. To perform their operation efficiently, the wings V must be in front of line in which the seed drops from the seed-tubes, while the wings W have to be to the rear of said line. The shoe T is hinged at $p$ to the frame of the machine, and can turn on said hinge in its longitudinal direction, for the purpose of compensating for uneven plowing and also of throwing off large clods and stalk-roots.

The frame X, which supports the center or driving wheel, is not secured permanently to the general frame of the machine, but is hinged to it only by means of the braces $q$, and can tilt on the driving-shaft. This is for the purpose of enabling the middle shoe to adapt itself to uneven ground. The frame X is connected to the tongue Y by means of two levers, Z. The fulcrum of each of these levers is at $r$, and one end of each lever rests against a pivot, $s$, while the other end is pivoted to the tongue at $t$. Should the middle shoe come into a lower or higher place than the two side shoes, the proper operation of the machine will not be disturbed, as all the shoes will remain in contact with the ground by means of the loose frame X, while the levers O and G can play vertically within the yoke M. A' represents the driver's seat. It is supported by two radius-bars, B', which are hinged to the seat at $u$ and to the frame X at $v$. The horizontal bars C', to which the seat A' is secured, are supported by two standards, D', of the frame A, and can be moved horizontally within the notches in which they rest. The arrangement of the driver's seat enables the driver to throw its weight to the front or to the rear end of the machine when the seat is moved in one or the other direction.

The operation of the machine is as follows: As the machine moves along, the revolving motion of the cam C imparts a reciprocating motion to the cam-yoke D and to the rods E and F. This motion causes the levers O and G to vibrate on their fulcra P and I, whereby the seed-slides K L N are vibrated in the usual manner, operating the seed-valves S and dropping the grain at the required intervals. The grain drops into the furrows made by the wings V, and is covered by the wings W. If the driver wishes to turn from one side of the field to the other, he slightly loosens the screw-nut $a$, thereby disconnecting the cam from the driving-shaft of the wheel B. He then sets his foot firmly on the sliding rod E, thereby preventing any movement of the seed-slides; and by now shoving the seat A' backward as far as it will go, he brings his weight to bear on the rear end of the machine, thereby raising the shoes T from the ground, and the machine is now free to be turned and moved without dropping any seed. Again, by tightening the screw-nut $a$, and by moving the seat A to its former position, the machine is ready for operation.

Having thus fully described the nature of my invention, what I claim therein as new, and desire to secure by Letters Patent, is—

1. The hinged shoe T, formed with a serrated plate, and with the wings V and W, substantially in the manner and for the purpose described.

2. The combination of the movable seat A' with and supported by the hinged radius-bars B', and by the sliding bars C', for the purpose of enabling the driver to raise or lower the front end of the machine, substantially in the manner and for the purpose described.

JACOB HAYNES.

Witnesses:
D. A. BROWN,
SAML. ADAMS.